(12) United States Patent
Subramanian et al.

(10) Patent No.: US 11,526,505 B2
(45) Date of Patent: Dec. 13, 2022

(54) ENABLING CROSS-PLATFORM QUERY OPTIMIZATION VIA EXPRESSIVE MARKUP LANGUAGE

(71) Applicant: Teradata US, Inc, San Diego, CA (US)

(72) Inventors: B. Anantha Subramanian, Bangalore (IN); Mohamed Yassin Eltabakh, Worcestor, MA (US); Mahbub Hasan, Kenmore, WA (US); Robert Matthew Wehrmeister, Austin, TX (US); Awny Kayed Al-Omari, Cedar Park, TX (US); Sanjay Sukumaran Nair, El Segundo, CA (US); Kashif Abdullah Siddiqui, Round Rock, TX (US); Mohammed Yassin Al-Kateb, Worchester, MA (US)

(73) Assignee: Teradata US, Inc., San Diego (GA)

( * ) Notice: Subject to any disclaimer, the term of this patent is extended or adjusted under 35 U.S.C. 154(b) by 141 days.

(21) Appl. No.: 16/704,802

(22) Filed: Dec. 5, 2019

(65) Prior Publication Data

US 2020/0183921 A1  Jun. 11, 2020

Related U.S. Application Data

(60) Provisional application No. 62/777,304, filed on Dec. 10, 2018.

(51) Int. Cl.
| | | |
|---|---|---|
| G06F 16/00 | (2019.01) | |
| G06F 16/242 | (2019.01) | |
| G06F 16/182 | (2019.01) | |
| G06F 16/27 | (2019.01) | |
| G06F 16/21 | (2019.01) | |

(52) U.S. Cl.
CPC ........ G06F 16/2433 (2019.01); G06F 16/182 (2019.01); G06F 16/211 (2019.01); G06F 16/278 (2019.01)

(58) Field of Classification Search
CPC .. G06F 16/2433; G06F 16/182; G06F 16/211; G06F 16/278; G06F 17/30867; G06F 17/30067; G06F 17/30595; G06Q 10/10; G06Q 10/06
See application file for complete search history.

(56) References Cited

U.S. PATENT DOCUMENTS

| | | | | |
|---|---|---|---|---|
| 2002/0120685 | A1* | 8/2002 | Srivastava | ................ G06F 9/44 |
| | | | | 715/255 |
| 2005/0091276 | A1* | 4/2005 | Brunswig | ......... G06F 16/90335 |
| 2005/0289125 | A1* | 12/2005 | Liu | .................... G06F 16/24526 |
| 2012/0191690 | A1* | 7/2012 | George | ............ G06F 16/24547 |
| | | | | 707/E17.108 |
| 2017/0193054 | A1* | 7/2017 | Tang | ................... G06F 16/2458 |
| 2019/0102426 | A1* | 4/2019 | Chaudhry | ......... G06F 16/24547 |

\* cited by examiner

*Primary Examiner* — Leslie Wong
*Assistant Examiner* — Suman Rajaputra
(74) *Attorney, Agent, or Firm* — Howard Speight

(57) ABSTRACT

A database system receives a request from a user. The request invokes a data set function (DSF) and uses a property to be provided by the DSF. The database system determines that a function descriptor is available for the DSF. The function descriptor is expressed as markup language instructions. The function descriptor defines the property of the DSF. The database system uses the function descriptor to define a property for the DSF.

20 Claims, 10 Drawing Sheets

```
Q2: Do we really
need to send all
columns?                    Q1: What is the output schema?

Select *
FROM ( SELECT * FROM SESSIONIZE@coprocessor (
    ON (SELECT * FROM web_click)
    PARTITION BY userid
    ORDER BY clicktime
    USING
        TimeColumn ('clicktime')
        TimeOut ('60')
    )AS output) AS q
WHERE userid = 0;

Q3: Can we push this predicate
before executing the function?
```

Q2: Do we really need to send all columns?

Q1: What is the output schema?

```
Select *
FROM ( SELECT * FROM SESSIONIZE@coprocessor (
      ON (SELECT * FROM web_click)
      PARTITION BY userid
      ORDER BY clicktime
      USING
            TimeColumn ('clicktime')
            TimeOut ('60')
      )AS output) AS q
WHERE userid = 0;
```

Q3: Can we push this predicate before executing the function?

Fig. 1

| Output Schema Specifications | | Unpivot |
|---|---|---|
| Column Name | Data Type | |
| accumulate_column | Same as in input table | ```
SELECT * FROM Unpivot (
  ON input_timeseries_table
  Unpivot ({ 'unpivot_column' | 'unpivot_range' }[,...])
  Accumulate ({ 'accumulate_column' | 'accumulate_column_range' }[,...])
  [ InputTypes ({ 'true' | 'yes' | 't' | 'y' | '1' | 'false' | 'no' | 'f' | 'n' | '0' }) ]
  [ AttributeColumn ('attribute_column') ]
  [ ValueColumn ('value_column') ]
);
``` |
| attribute_column | VARCHAR | |
| value_column | VARCHAR | |
| value_column_double | DOUBLE PRECISION | Appears when InputTypes('true') and an unpivot column has a real data type. Contains the unpivoted value of the corresponding attribute if the value is real; NULL otherwise. |
| value_column_long | LONG | Appears when InputTypes('true') and an unpivot column has an integer data type. Contains the unpivoted value of the corresponding attribute if the value is integer; NULL otherwise. |
| value_column_str | VARCHAR | Appears when InputTypes('true') and an unpivot column has a data type other than real or integer. Contains the unpivoted value of the corresponding attribute. |

Fig. 2

| Column Name | Meaning |
|---|---|
| accumulate_column | Take whatever columns listed in parameter *Accumulate* and add them to the output. The data type is the same as that of the inputs. |
| attribute_column | Take the column name defined in parameter *AttributeColumn* (if exist) and add it to the output. The data type is *Varchar*. |
| value_column | Take the column name defined in parameter *ValueColumn* (if exist) and add it to the output. The data type is *Varchar*. |
| value_column_double | Take the column name defined in parameter *ValueColumn* (if exist) and add it to the output postfixed with string "_double". The data type is *Double*. This column is in the output only if the parameter *InputTypes* is set to "true". |
| value_column_long | Take the column name defined in parameter *ValueColumn* (if exist) and add it to the output postfixed with string "_long". The data type is *Long*. This column is in the output only if the parameter *InputTypes* is set to "true". |
| value_column_str | Take the column name defined in parameter *ValueColumn* (if exist) and add it to the output postfixed with string "_str". The data type is *Varchar*. This column is in the output only if the parameter *InputTypes* is set to "true". |

Fig. 3

```
SELECT * FROM pivot (
  ON input_table PARTITION BY partition_column[,...]
  [ ORDER BY order_column]
  PartitionColumns
    ({ 'partition_column' | 'partition_column_range' }[,...])
  { NumberOfRows ('number_of_rows') |
    PivotColumn ('pivot_column')
    [ PivotKeys ('pivot_key' [,...]) ]
    [ NumericPivotKey (('true'|'t'|'yes'|'y'|'1'|'false'|'f'|'no'|'n'|'0')) ]
  }
  TargetColumns ({ 'target_column' | 'target_column_range' }[,...])
);
```

Fig. 8

| Column Name | Data Type | Description |
|---|---|---|
| partition_column | Any | Column on which the input data is partitioned. If there are p partition columns and partition column i has $v_i$ distinct values, then the output table has $p * v_i$ rows. |
| metric_column_i | Any | If you specify the NumberOfRows argument, then i is the number of an input row in a partition; otherwise i is a pivot_key. For example, if you specify NumberOfRows(3), then the output table has the columns metric_column_0, metric_column_1, and metric_column_2; if you specify PivotKeys('a', 'b'), then the output table has the columns metric_column_a, and metric_column_b. The column metric_column_i contains the value of metric_column for partition row or pivot key i. |

Fig. 9

```
SELECT * FROM pivot (
  ON pivot_input
  PARTITION BY sn, city, week
  ORDER BY week
  PartitionColumns ('sn', 'city', 'week')
  NumberOfRows (3)           This number controls the
  TargetColumns ('value')    #columns in the output
) ORDER BY 1,2,3;
```

| sn | city | week | value_0 | value_1 | value_2 |

Fig. 10

```
SELECT * FROM PCAPlot (
  ON input_table AS inputtable PARTITION BY ANY
  ON pca_table AS pca_table DIMENSION
  Components ('num_components')
  [ Accumulate
    ({ 'accumulate_column' | 'accumulate_column_range' }[,...]) ]
);
```

Fig. 11

| Column Name | Data Type | Description |
|---|---|---|
| dimension_i | DOUBLE PRECISION | Values of the ith dimension of the data set. The table has one such column for each dimension. The number of dimensions is determined by the PCA_Map argument TargetColumn. |
| accumulate_column | Same as in input table | Column copied from the input table. |

Fig. 12

```
CREATE DIMENSION TABLE pcr1 AS
SELECT * FROM PCAPlot (
   ON pca_scaled AS inputtable PARTITION BY ANY
   ON pca_health_ev2 AS pca_table DIMENSION
   Accumulate ('pid', 'strokes')
   Components ('3')
) ORDER BY 1;
```

| pid | strokes | principal_component_1 | principal_component_2 | principal_component_3 |

The number of columns depend on the value in "Components" parameter

Fig. 13

```
SELECT * FROM NaiveBayesPredict (
  ON input_table
  [ ON { table | view | query } AS model DIMENSION ]
  [ Domain ('host:port') ]
  [ Database ('db_name') ]
  [ UserID ('user_id') ]
  [ Password ('password') ]
  [ SSLSettings ('SSLsettings') ]
  [ SSLTrustStorePassword ('SSLtruststorepassword') ]
  [ Model ('model_table_name') ]
  IDCol ('test_point_id_col')
  NumericInputs ({ 'numeric_input_column' |
    'numeric_input_column_range' }[,...] )
  CategoricalInputs ({ 'categorical_input_column' |
    'categorical_input_column_range' }[,...] )
  [ Responses ('response' [,...]) ]
);
```

Fig. 14

| Column Name | Data Type | Description |
|---|---|---|
| id | INTEGER | Row identifier. |
| prediction | VARCHAR | Prediction for this observation. |
| loglik_response_i | DOUBLE PRECISION | Loglikelihood (natural logarithm of the probability) that this observation has response_i. The table has one column for each possible response. For example, if the possible responses are 'Yes' and 'No', then the table has columns loglik_Yes and loglik_No. |

Fig. 15

```
DROP TABLE IF EXISTS nb_iris_predict;
CREATE TABLE nb_iris_predict (PARTITION KEY(id)) AS
SELECT * FROM NaiveBayesPredict (
  ON nb_iris_input_test
  Model ('nb_iris_model')
  IDCol ('id')
  NumericInputs ('[1:4]')
) ORDER BY id;
SELECT * FROM nb_iris_predict ORDER BY 1;
```

| id | prediction | loglik_virginica | loglik_setosa | loglik_versicolor |

These are the distinct values in the model table

Fig. 16

ENABLING CROSS-PLATFORM QUERY OPTIMIZATION VIA EXPRESSIVE MARKUP LANGUAGE

CROSS-REFERENCE TO RELATED APPLICATIONS

This application claims the benefit of U.S. Provisional Patent Application No. 62/777,304, entitled "Enabling Cross-Platform Query Optimization via Expressive Markup Language," filed on Dec. 18, 2018, which is incorporated by reference in its entirety.

BACKGROUND

Data processing systems may execute a workflow composed of systems and/or user defined functions that may execute on a single or multiple execution engines. The typical execution scenario, which is facilitated by the Foreign Function Execution (FFE) and TERADATA®'s QUERYGRID™ (TERADATA's parallel data transport framework) infrastructures) where the TERADATA and QUERYGRID trademarks are owned by Teradata US, Inc, involves the following steps: (1) Users submit their SQL queries (involving remote analytical function invocations) to a database system (such as, but not limited to, a TERADATA database system), (2) the database system sends a function invocation request along with the needed data to the remote system, (3) The remote system executes the function and generates the results, and (4) the results are sent back to the database system (within the context of the caller SQL query).

FIG. 1 illustrates such a query. As can be seen, the query includes a "SESSIONIZE" data set function (DSF), which is defined to be a function that takes one or more data sets (or relational tables) as input and generates one or more data sets (or relational tables) as output. DSFs can execute locally at the caller system or remotely on a coprocessor engine. A coprocessor engine (or coprocessor) is a second data processing engine executing any part of the query data processing workflow. A coprocessor may reside at the same integrated platform or at a separate platform on premises or at the cloud. A remote analytical function ("RAF"), where an RAF is defined to be a function that may be called by a database system but that is executed by a foreign system, is a special case of a DSF.

The challenge is that given such a query, e.g., the query invoking a DSF such as the SESSIONIZE function in the FIG. 1, the DSF may be a "blackbox" to the database system in that the database system does not know the properties of the invoked DSF. For example, the database system may not know (1) the output schema to be returned from the DSF (i.e., Q1 in FIG. 1), (2) whether all columns of the input table (e.g., web_click in the example shown in FIG. 1) are needed by the DSF or only small subset of columns (i.e., Q2 in FIG. 1), and (3) whether or not a post-function predicate ("user_id=o" in the example shown in FIG. 1) can be pushed inside the ON clause to be evaluated on the web_click table before executing the DSF (i.e., Q3 in FIG. 1).

Determining these properties could enable optimizations that yield significant performance gains. However, capturing these properties is not straightforward because the properties may be dynamic and some or all of them may only be resolved at query time, where "query time" is defined to be the time that the query is being executed by the database system, given a specific invocation.

FIGS. 2 and 3 illustrate an example. FIG. 2 shows the invocation format and input schema specifications for the Unpivot( ) DSF provided by a coprocessor (specifically, an Aster coprocessor). The output schema can be interpreted as shown in FIG. 3.

The wide diversity of the DSFs and the high complexity of their property specifications, as illustrated in FIGS. 2 and 3, show the challenge of using DSFs.

SUMMARY

In one aspect, a method includes a database system receiving a request from a user. The request invokes a data set function (DSF) and uses a property to be provided by the DSF. The database system determines that a function descriptor is available for the DSF. The function descriptor is expressed as markup language instructions. The function descriptor defines the property of the DSF. The database system uses the function descriptor to define a property for the DSF.

Implementations may include one or more of the following. The method may include a developer creating the DSF to execute on a remote system, the developer writing the descriptor for the DSF, and the database system receiving and storing the descriptor for the DSF. The method may include a developer creating the DSF to execute on the database system, the developer writing the descriptor for the DSF, and the database system receiving and storing the descriptor for the DSF. The markup language may be an instruction-based language. The method may include using the function descriptor to define an output schema for the DSF. The method may include using the function descriptor to define an input schema for the DSF. The method may include using the function descriptor to determine to push a predicate in the request from the DSF's output to the input of the DSF. The method may include using the function descriptor to determine to push a projection in the request from the input of the DSF to the output of the DSF. The method may include using the function descriptor to estimate a cardinality of the property. The method may include using the function descriptor to determine if the DSF inherits or obeys specific ordering or partitioning schemes.

In another aspect, a non-transitory computer-readable tangible medium records a computer program. The computer program includes executable instructions, that, when executed, perform a method. The method includes a database system receiving a request from a user. The request invokes a data set function (DSF) and uses a property to be provided by the DSF. The database system determines that a function descriptor is available for the DSF. The function descriptor is expressed as markup language instructions. The function descriptor defines the property of the DSF. The database system uses the function descriptor to define a property for the DSF.

In another aspect, a method includes a database system receiving a request from a user, wherein the request invokes a data set function (DSF) and uses a property to be provided by the DSF. The database system determines that a function descriptor is not available for the DSF. The database system determines that a contract function is available for the DSF. The database system using the contract function to optimize the request.

BRIEF DESCRIPTION OF THE DRAWINGS

FIG. 1 is an illustration of a request that invokes a DSF.

FIG. 2 shows the invocation format and output schema specifications for the Unpivot( ) DSF provided by a coprocessor.

FIG. 3 illustrates a description of the output schema for the Unpivot( ) DSF of FIG. 2.

FIG. 8 shows the specifications of a Pivot DSF invocation.

FIG. 9 shows the output schema specifications for the Pivot DSF.

FIG. 10 shows an example Pivot DSF invocation and output schema.

FIG. 11 shows the specifications of a PCAPlot DSF.

FIG. 12 shows the output schema for the PCAPlot DSF.

FIG. 13 shows an example of the invocation of PCAPlot DSF and the resulting output schema.

FIG. 14 shows the specifications of a NaiveBayesPredict DSF.

FIG. 15 shows the output schema for the NaiveBayesPredict DSF.

FIG. 16 shows an example of the invocation of NaiveBayesPredict DSF and the resulting output schema.

DETAILED DESCRIPTION

Figure 4:
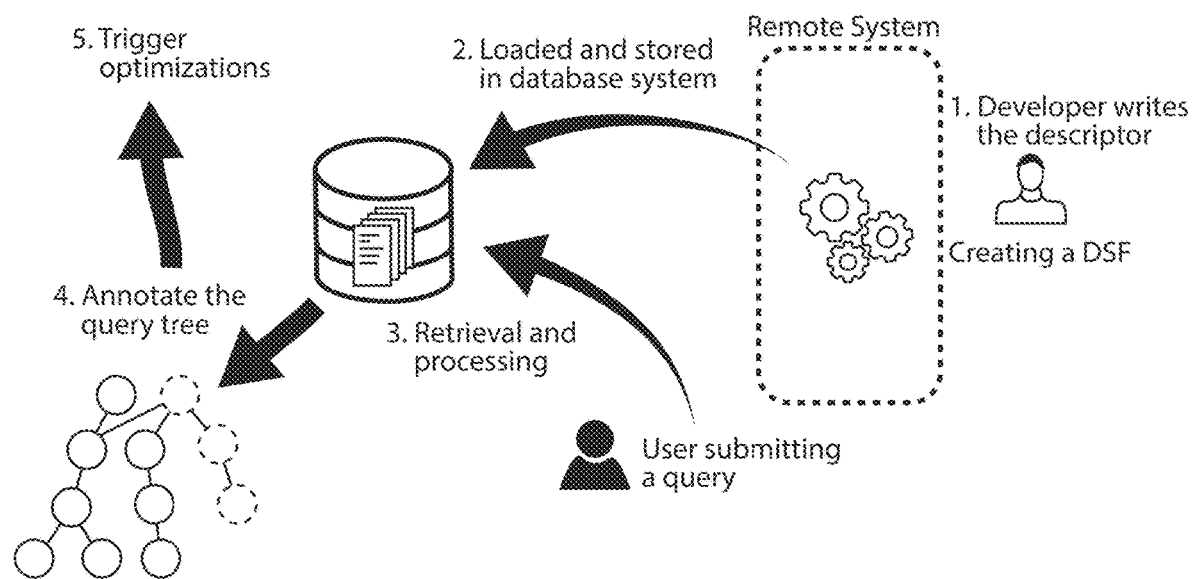
FIG. 4 illustrates the lifecycle of a newly introduced function descriptor from creation to enabling optimizations.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

A technique for addressing the complexity of using DSFs captures properties of the analytical functions that can enable efficient compilation and execution of the function from within the database system. The technique focusses on three specific properties of a DSF (although it will be understood that the technique is not limited to these specific properties and may be used to define other properties of a DSF):

Output Schema: Inferring the schema specifications, i.e., column names and data types, of the DSF's output. The output schema is helpful in compilation of the SQL query (see Q1 in FIG. 1).

Input Schema: Inferring the minimal (i.e., mandatory) set of columns in the input table(s) that the DSF needs for execution. This property is used for enabling the projection-push optimization, i.e., eliminating any unneeded (or non-beneficial) columns before transferring the data to the coprocessor. Projection-push can significantly reduce the data transfer overhead if the base table has many columns while the function only needs few of these columns for its internal processing (refer to Q2 in FIG. 1).

Predicate Push: Inferring the possibilities of pushing a post-function predicate, i.e., a predicate on the function's output, to evaluate on the function's input instead. This property is useful for enabling the predicate-push optimization, i.e., eliminating any unneeded records before transferring the data to the coprocessor. Predicate-push can significantly reduce the data transfer overhead, and it can also enable the generation of more efficient query plans by possibly leveraging available access paths (refer to Q3 in FIG. 1).

In a standard un-optimized setup, a database system may employ a "contract function" to communicate with the coprocessor at query time to retrieve DSF properties. This contract function mechanism has several limitations, including:

Communication Overhead: The communication between the database system and the coprocessor goes through the network and, in the TERADATA system, the QUERYGRID, which introduces some unnecessary overhead.

Limited Property Inference and No Optimizations: The mechanism is used to infer only the output schema of the DSF, which is needed for query compilation. No other properties are inferred. As a result, the predicate push and projection push optimizations highlighted above are difficult to detect or apply.

Mock Function Execution: In order to infer the output schema of a DSF, the contract mechanism performs a mock execution of the DSF over empty inputs. The schema of the inputs as well as the values of any parameters extracted from the DSF's invocation are used in the mock execution to get the corresponding output schema. The mock execution introduces some overhead.

Some database systems allow for plan directives to aid in selecting a specific plan for a given query (or at least disabling some of the possible alternatives). This mechanism is used either for debugging purposes or is leveraged by expert users to enforce a specific execution plan. Plan directives have fundamental differences to the technique described herein including: (1) plan directives typically target the standard relational operators, e.g., joins, sorting, selection, and aggregation, while the technique described herein targets the DSFs integrated with the SQL engine; (2) plan directives are usually at the physical plan level, e.g., disabling or enabling a physical operation such as index scan, hash join, nested-loop join, sort-based aggregation, etc., while the technique described herein operates at the logical plan level; (3) plan directives are static, while the technique described herein is dynamic, i.e., the same DSF in two different queries may have different properties; and (4) plan directives usually narrow down the optimizer choices of the possible plans to generate, while the technique described herein opens up additional opportunities for generating more equivalent plans.

The technique described herein employs a "function descriptor" as a possible way of communicating DSF properties between a coprocessor and a database system.

FIG. 4 illustrates the lifecycle of a newly introduced function descriptor from creation to enabling optimizations. In a first phase (labeled "1" in FIG. 4), the developer creates a DSF (or alternatively, the developer integrates the remote coprocessor with the database system) and writes a function descriptor in a markup language, described below. Note that, while FIG. 4 and the discussion of FIG. 4 that follows assumes the DSF is developed to be executed on a "Remote System" and thus could be described as an RAF, the same concepts discussed here apply to DSFs that execute locally at the caller system.

In a second phase (i.e., the "function installation" phase, labeled "2" in FIG. 4) the function descriptor is uploaded to the database system during installation of the DSF (or, alternatively, during the registration of the remote system with the database system) and stored inside the database system for future access.

In a third phase (labeled "3" in FIG. 4), given a query invoking the DSF, the database system retrieves the corresponding function descriptor and applies it over the given function invocation to infer the desired properties.

In a fourth phase (labeled "4" in FIG. 4), the database system uses the inferred properties to annotate the query plan with metadata information.

In a fifth phase (labeled "5" in FIG. 4), the database system's query optimizer uses the metadata added in the fourth phase to trigger appropriate rewriting and optimization, e.g., predicate push and projection push.

The technique uses a markup language for function descriptors. The markup language may be based on Java Script Object Notation (JSON) or any similar method or language for expressing the properties of a DSF. The markup language is (1) simple to allow broad adoptability, (2) highly expressive for wide coverage to most, if not all, DSFs, and (3) extensible for future extensions. The markup language is designed to capture several properties of interest to the query optimizer, including the output schema, input schema, predicate push, cardinality estimation, and interesting ordering of a DSF. The markup language is applicable to describe both DSFs and functions that are native to the database system. The markup language may be verified for syntactic and semantic accuracy and then interpreted at query time or cached and reused for fulfilling subsequent query processing requirements.

The technique uses function descriptors, which are valid instances of the markup language that act as the driver for triggering appropriate optimizations based on the DSF's properties and the query context.

The technique endeavors to enable runtime optimizations that minimize the data transfer back and forth between the database system and the coprocessor. These optimizations may also reduce the execution resource consumption and improve the performance at the coprocessor engine. This is demonstrated with two optimizations mentioned above, namely projection push and predicate push. Note that these optimizations are also applicable for DSFs executing locally on the database system by minimizing the data flow into the relatively expensive function execution. Hence, benefits extend to both remote and local function processing.

Function Descriptor Overview

A function descriptor is a JSON-based document that captures specific properties of a given DSF. These properties are of interest to the query optimizer to help enable better execution plans. In some cases, the properties' values are static, i.e., the values depend solely on the DSF's logic independent of any invocation details. In this case, the function descriptor includes the property name along with its value.

However, in many cases, the properties' values are dynamic, i.e., the values depend on the content of the DSF's invocation, and hence are determined at query time. In this case, the function descriptor includes the property name along with instructions on how to infer the value given specific invocation details. Given the polymorphic nature of most DSFs, dynamic properties are very common.

The dynamic nature of DSF properties is illustrated in FIGS. 2 and 3 for the Unpivot DSF.

The function descriptor is designed with the following principles in mind:

Extensibility: Function descriptors are designed to be extensible, which is one of the reasons JSON-based format is used. The function descriptors may initially be designed to capture a specific set of DSF properties of key interest to the database system's query optimizer. However, the extensibility feature enables extending the descriptors to capture more properties in the future.

Lightweight: Since the function descriptors are retrieved and parsed during query compilation and optimization, the function descriptors are lightweight with respect to storage, retrieval, and parsing.

Usability: Function descriptors are written either by a team developing the corresponding DSFs or by a team registering the DSFs with the database system. The function descriptors are designed as a high-level expressive language for better usability by these teams as well as the ease of comprehending the properties of a given DSF.

Portability: While the function descriptor system may be developed for a specific foreign processor (such as the Aster coprocessor system), the function descriptors should be a backbone for describing DSFs from other coprocessors, e.g., Spark, TensorFlow, and Fuzzy Logix, as well as local database functions.

The function descriptors capture the following set of DSF properties:

Output Schema: The property captures the schema of the DSF's output, which is consumed within the caller SQL query in the database system. The output schema captures the column names, the data types, and possibly nullability specifications. Usage (Why it is captured): This property is essential for the compilation of the query and the generation of the query plan.

Input Schema: This property captures the minimal (mandatory) set of columns that the DSF needs for execution. Usage (Why it is captured): This property is used for enabling the projection-push optimization, which involves the elimination of any unneeded (or non-beneficial) columns before transferring the data to the coprocessor. Projection-push can significantly reduce the data transfer overhead if the base table has many columns while the DSF only needs few of these columns for its internal processing.

Predicate Push: This property captures the possibility of pushing a post-DSF predicate, i.e., a predicate on the DSF's output, to evaluate on the DSF's input instead. Usage (Why it is captured): This property is used for enabling the predicate-push optimization, which involves the elimination of any unneeded records before transferring the data to the coprocessor. Predicate-push can significantly reduce the data transfer overhead, and it can also enable the generation of more efficient query plans by possibly leveraging available access paths.

Cardinality Estimation: This property captures some estimations on the output cardinality (the number of rows) of the DSF. Usage (Why it is captured): This property is used for enabling better query planning and possibly avoiding Incremental Plan Execution (IPE) overhead.

Interesting Ordering: This property captures whether the output of the DSF inherits or obeys specific ordering or partitioning scheme. Usage (Why it is captured): This property is used for enabling better query planning by possibly avoiding unnecessary re-ordering or re-distribution.

These properties are captured in a JSON document with the following structure:

```
{ "functionName" : "<FunctionName>",
"outputSchema": [<array of Output-Schema docs>],
"inputSchema": [<array of Input-Schema docs>],
"predicatePush": [<array of Predicate-Push docs>],
"cardinalityEstimation": [<array of Cardinality-Estimation docs>],
"interestingOrdering": [<array of Interesting-Ordering docs>]
}
```

The elements of the above structure may have the attributes described in Tables 1 and 2.

TABLE 1

| Element Name | Value Type | Value Domain | Description |
|---|---|---|---|
| "functionName" | String | Arbitrary string | This property specifies the name of the corresponding DSF. |
| "outputSchema" | Array of JSON documents | JSON documents of type OS-D1 | This property holds one document of type OS-D1 for each output that is candidate to be the primary output. A primary output is an output that is returned to the caller SQL query. The document contains instructions for inferring the output schema, e.g., column names and data types, at query time. |
| "inputSchema" | Array of JSON documents | JSON documents of type IS-D1 | This property holds one document of type IS-D1 for each input to the DSF. The document contains instructions for inferring the minimal input schema needed by the DSF. |
| "predicatePush" | Array of JSON documents | JSON documents of type PP-D1 | This property holds one document for each output that is candidate to be the primary output. The document specifies the types of post-DSF predicates that can be pushed as pre-DSF predicates. |
| "cardinalityEstimation" | Array of JSON documents | JSON documents of type CE-D1 | This property holds one document for each output that is candidate to be the primary output. The document specifies instructions for inferring some information on the cardinality estimation (number of rows) of the DSF's output. |
| "interestingOrdering" | Array of JSON documents | JSON documents of type ORD-D1 | This property holds one document for each output that is candidate to be the primary output. The document specifies several interesting-ordering properties of the DSF's output. |

TABLE 2

| Element Name | Presence | Empty Content Allowed | Empty Content Representation |
|---|---|---|---|
| "functionName" | Mandatory | No | N/A |
| "outputSchema" | Mandatory | Yes (Indicates that the descriptor does not cover the output schema specifications, and the contract function fall back mechanism is in effect). | Empty array ([ ]) |
| "inputSchema" | Mandatory | Yes (Indicates that the descriptor does not cover the input schema specifications, | Empty array ([ ]) |

TABLE 2-continued

| Element Name | Presence | Empty Content Allowed | Empty Content Representation |
|---|---|---|---|
| | | and projection-push optimization is disabled for all inputs). | |
| "predicatePush" | Mandatory | Yes (Indicates that the predicate-push optimization is disabled, i.e., no post-DSF predicates can be pushed to be pre-DSF). | Empty array ([ ]) |
| "cardinalityEstimation" | Optional | Yes (Indicates that the descriptor does provide information on the cardinalities of the DSF's output). | Empty array ([ ]) |
| "interestingOrdering" | Optional | Yes (Indicates that the descriptor does provide information on any interesting ordering that the DSF's output may follow). | Empty array ([ ]) |

The function descriptor mechanism is introduced to overcome the limitations of the contract function described above. However, the function descriptors are optional, i.e., a DSF may not have a function descriptor. This may be because either the DSF's properties are too complex to be expressed using the markup language, the DSF is not of a high-priority and the developer is not willing to spend some time developing the function descriptor, or there is not enough expertise to develop the function descriptor. Therefore, the function descriptor mechanism is designed to co-exist with the contract function mechanism.

Figure 5A:
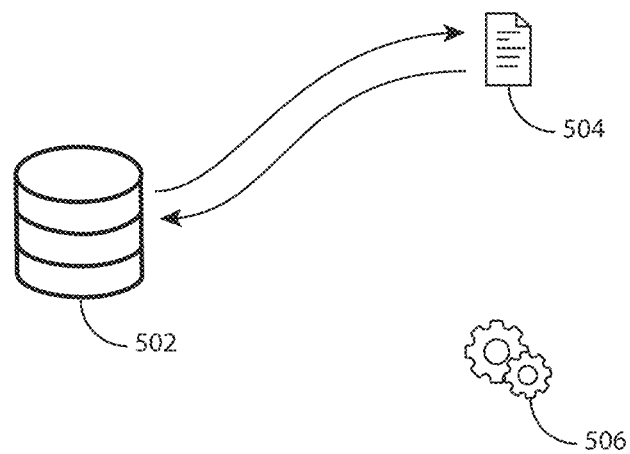
FIGS. 5A and 5B illustrate the co-existence of the function descriptor mechanism and the contract function mechanism.
Figure 5B:
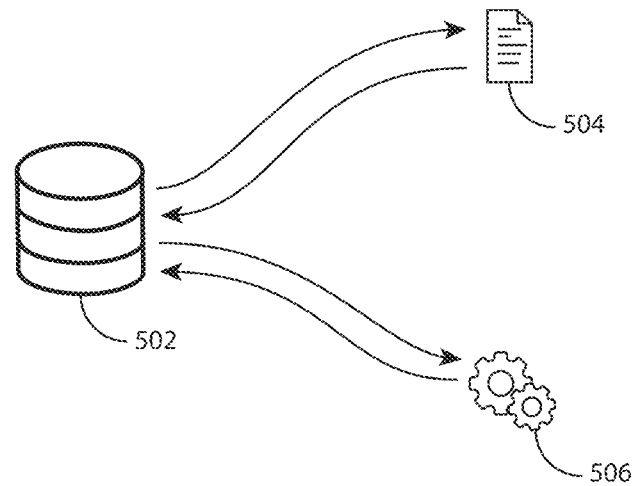

FIGS. 5A and 5B illustrate the co-existence of the two mechanisms. When a DSF is invoked, the database system 502 checks the function descriptor 504 first. If a function descriptor 504 for the DSF exists, is available, and can provide the value of the requested property, then the contract function 506 is not accessed, as shown in FIG. 5A. Otherwise, as shown in FIG. 5B, the contract function 506 is executed (this is only for the output schema inference because the other properties may not be supported by the contract functions). If neither a function descriptor 504 nor a contract function 506 exists or provides the value of the requested property for the DSF, optimization of the DSF is not implemented.

Markup Language: Building Block Instructions

The markup language is the language in which the function descriptors are expressed. It is a high-level JSON-based language consisting of a set of instructions.

The language may have two building block instructions that are used to express the values of the different properties. These instructions are:

ADD Instruction: The ADD instruction is used to add column information to the output or input schema lists. The added columns may come from one of the DSF's input tables, one of the DSF's invocation parameters, or they may be predefined.

CASE Instruction: The CASE instruction is a control (branching) instruction, very similar to the CASE statement in programming languages. It is used because in many cases the content of a DSF's output schema may depend on the presence or absence of some values or parameters. Such conditional construction of the property value requires a CASE instruction.

ADD Instruction

The ADD instruction is used to add column information to the output schema list or input schema list. The instruction includes specifications to define: (1) The location within the list to which the added column(s) are augmented, (2) the source that provides the column information to be added, which can be one of the input tables or one of the DSF parameters, (3) the data types of the columns to be added, and (4) any manipulation operations to be applied on the column names before adding them to the list.

Figure 6:
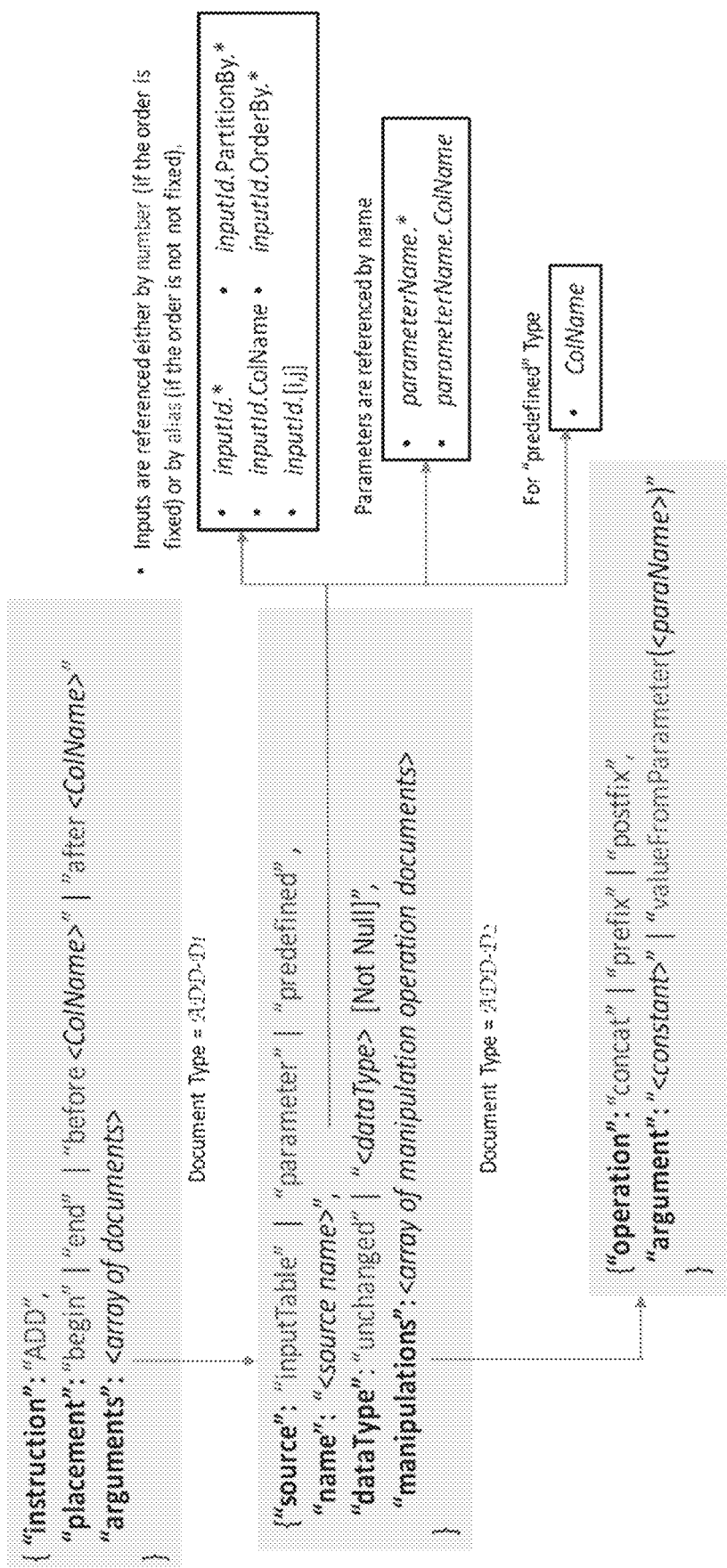
FIG. 6 shows the structure of the ADD instruction.

FIG. 6 shows the structure of the ADD instruction. The ADD instruction consists of three nested document types, referred to as ADD-D1, ADD-D2, and ADD-D3 as indicated in FIG. 6.

The ADD-D1 document is the first (parent) level of an ADD instructions. The elements of document type ADD-D1 are described in Tables 3 and 4.

TABLE 3

| Element Name | Value Type | Value Domain | Description |
|---|---|---|---|
| "instruction" | String | Fixed value = "ADD" | This property indicates that the document is an ADD instruction. |
| "placement" | String | The value is one of the following values: | This property specifies the position to which the newly |

TABLE 3-continued

| Element Name | Value Type | Value Domain | Description |
|---|---|---|---|
| | | "begin", "end", "before <ColName>", "after <ColName>" | added columns are inserted in the generated output schema list. "begin": The new columns are added to the begin of the list (e.g., the left-most position) "end": The new columns are added to the end of the list (e.g., the right-most position) "before <ColName>": The new columns are added just before the column name specified in variable <ColName>. Constraint: <ColName> must be already added to the output schema list by a previous ADD instruction. Otherwise, an error is generated. "after <ColName>": The new columns are added just after the column name specified in variable <ColName>. Constraint: <ColName> must be already added to the output schema list by a previous ADD instruction. Otherwise, an error is generated. |
| "arguments" | Array of documents | JSON documents of type ADD-D2 | Each document must define one or more columns to be added to the output schema list |

TABLE 4

| Element Name | Presence | Empty Content Allowed | Empty Content Representation |
|---|---|---|---|
| "instruction" | Mandatory | No | N/A |
| "placement" | Mandatory | No | N/A |
| "arguments" | Mandatory | No | N/A |

Document type ADD-D2 is the second level document in an ADD instruction, as shown in FIG. 6. Document ADD-D2 describes the details of the columns to be added to the output schema list. The elements of document type ADD-D2 are described in Tables 5 and 6.

TABLE 5

| Element Name | Value Type | Value Domain | Description |
|---|---|---|---|
| "source" | String | The value must be one of the following: "inputTable", "parameter", "predefined" | This property specifies the source of the columns to be added (the lineage). "inputTable": Indicates that the column names to be added come from one of the DSF's input tables (which are defined in the ON clause(s) in the DSF invocation). "parameter": Indicates that the column names to be added come from one of the DSF's parameters (which are defined in the USING clause in the DSF invocation). "predefined": Indicates that the column names to be added are predefined, i.e., the names depend on neither the inputs nor the parameters in the DSF invocation. These are usually additional columns that the DSF adds to the output, and the names, data types, etc. of these columns are predefined. |

TABLE 5-continued

| Element Name | Value Type | Value Domain | Description |
|---|---|---|---|
| "name" | String | The allowed value depends on the value assigned to the "source" property, and it must follow specific expressions as specified in Table 7. | This property specifies which columns are inherited from the "source" and augmented to the output schema list. |
| "dataType" | String | The value must be either a constant string = "unchanged", or string defining the data type and the null-ability status | This property specifies the data type of the column(s) added to the output schema list. "unchanged": Indicates that the columns will inherit the same data types they already have. Constraint: This setting is allowed only if the "source" property is set to "inputTable" or "parameter". Implicit Assumption: It is implicitly implied that these columns allow Null (a conservative assumption). The markup language could be extended to provide more detailed specifications at the expense of adding complexity. "<dataType> [Not Null]": Indicates that the column(s) conforms to the data type specified in <dataType>. The "Not Null" specification is optional. If it is known that the column(s) will not have Null values, then "Not Null" can be defined along with the data type. Constraint: This setting must be used if the "source" property is set to "predefined". Otherwise, this setting can be still used if the "source" property is set to "inputTable" or "parameter", especially if some manipulation operations are applied on the column(s). |
| "manipulations" | Array of JSON documents | JSON documents of type ADD-D3 | In some cases, some manipulation operations need to be applied on the column names before adding them to the output schema list, e.g., prefixing the names with some fixed string. The "manipulations" element defines these operations (if any). |

TABLE 6

| Element Name | Presence | Empty Content Allowed | Empty Content Representation |
|---|---|---|---|
| "source" | Mandatory | No | N/A |
| "name" | Mandatory | No | N/A |
| "dataType" | Mandatory | No | N/A |
| "manipulations" | Optional | Yes (Indicates that there are no manipulation operations to be applied on the column names). | Either the entire element is not present, or an empty array ([ ]). |

The allowed expressions in the "name" property in document type ADD-D2 are listed in Table 7.

TABLE 7

| Value in "source" | Allowed Expression in "name" | Description | # of Added Columns |
|---|---|---|---|
| "inputTable" | inputId.* | Adding all columns from inputId to the output schema list | Equal to the number of columns in inputId |
|  | inputId.ColName | Adding the column named ColName from inputId to the output schema list | One |
|  | inputId.[i, j] | Adding the columns starting from position i (inclusive) to position j | $j - i + 1$ |

TABLE 7-continued

| Value in "source" | Allowed Expression in "name" | Description | # of Added Columns |
|---|---|---|---|
| | | (inclusive) from inputId to the output schema list. The position index starts from 1. | |
| | inputId.PartitionBy.* | Adding the columns in the Partition By clause of inputId to the output schema list | Equal to the number of columns in the Partition By clause of inputId |
| | inputId.OrderBy.* | Adding the columns in the Order By clause of inputId to the output schema list | Equal to the number of columns in the Order By clause of inputId |
| "parameter" | parameterName.* | Adding all the columns from the DSF's parameter parameterName to the output schema list | Equal to the number of columns referenced in parameterName |
| | parameterName.ColName | Adding the column ColName from the DSF's parameter parameterName to the output schema list | One |
| "predefined" | ColName | String specifying the predefined column name to be added to the output schema list | One |

Referencing a specific input within a DSF's invocation (which is denoted by the "inputId" variable in the expressions listed in Table 7) follows the following rules:

Position-Based Referencing: In this referencing scheme, a reference to a specific input is achieved by the position of its ON clause relative to the other ON clauses. For example, the input in the first ON clause is referenced as "input1", the input in the second ON clause is referenced as "input2", etc.

Applicability: This referencing scheme is applicable only if the order of the inputs in the DSF's invocation is fixed and there are no optional ON clauses.

Alias-Based Referencing: In this referencing scheme, a reference to a specific input is achieved by its alias. For example, the input in the first ON clause has alias "model", and thus this input can be referenced in the "name" property of document type ADD-D2 by that alias.

Applicability: This referencing scheme is applicable only if the DSF's manual mandates specific aliases to be given to the inputs. In this case, the relative order among the ON clauses in not important, and hence the Relative-Order referencing must not be used.

Referencing a specific parameter from a DSF's invocation (which is denoted by the "parameterName" variable in the expressions listed in Table 7) is straightforward because parameters can be only referenced by their names.

Document type ADD-D3 is the third level document in an ADD instruction. If there are some manipulation operations to be applied over the column names before adding them to the output schema list, then these operations are defined according to the structure in document type ADD-D3, as shown in FIG. 6.

The elements of document type ADD-D3 are described in Tables 8 and 9:

TABLE 8

| Element Name | Value Type | Value Domain | Description |
|---|---|---|---|
| "operation" | String | The value must be one of the following values: "concat", "prefix", "postfix" | This property specifies the type of the manipulation operation to be applied. |
| "argument" | String | The value is either a constant string or string retrieved from a DSF's parameter. Therefore, the value is either: <constant>, valueFromParameter(<paramName>) | The property provides the string, which is an argument to the operation. "<constant>": The argument string is a fixed string. valueFromParameter(<paramName>): The argument string is dynamic and it is retrieved at query time from the DSF's parameter paramName. |

TABLE 9

| Element Name | Presence | Empty Content Allowed | Empty Content Representation |
|---|---|---|---|
| "operation" | Mandatory | No | N/A |
| "argument" | Mandatory | No | N/A |

As an example of use of the ADD instruction, the output schema specifications of the Unpivot( ) function shown in FIGS. 2 and 3 are shown below. For simplicity, in this example only first three entries from FIG. 2, which do not require checking to determine whether the InputTypes parameter is set to "true," are included. Note that the list is order sensitive. Note also that the names written in the "Accumulate" field depend on the parameter names in the query itself. For example, in the Unpivot( ) function shown in FIG. 2, the parameters attribute_column and value_column are accumulate columns.

```
{"instruction": "ADD",
"placement": "end",
"arguments": {
    {"source": "parameter",
    "name": "Accumulate.*",
    "datatype": "unchanged",
    "manipulations": [ ]
    },
    {"source": "parameter",
    "name": "AttributeColumn.*",
    "datatype": "VARCHAR",
    "manipulations": [ ]
    },
    {"source": "parameter",
    "name": "ValueColumn.*",
    "datatype": "VARCHAR",
    "manipulations": [ ]
    },
}
```

CASE Instruction

The CASE instruction is used when there are different alternatives for the output schema based on some conditions, e.g., the presence of absence of a specific parameter, or a parameter is set to specific value. In such scenarios, the CASE instruction is used to create the branching.

As in most programming languages, at most one CASE branch can evaluate to True to be executed. Once the condition(s) of one branch evaluate to True, no further branches are evaluated. It is possible that none of the branches evaluates to True, and as a result none of them is executed.

The CASE instruction consists of three levels of documents, referred to as CASE-D1, CASE-D2, CASE-D3.

Figure 7:
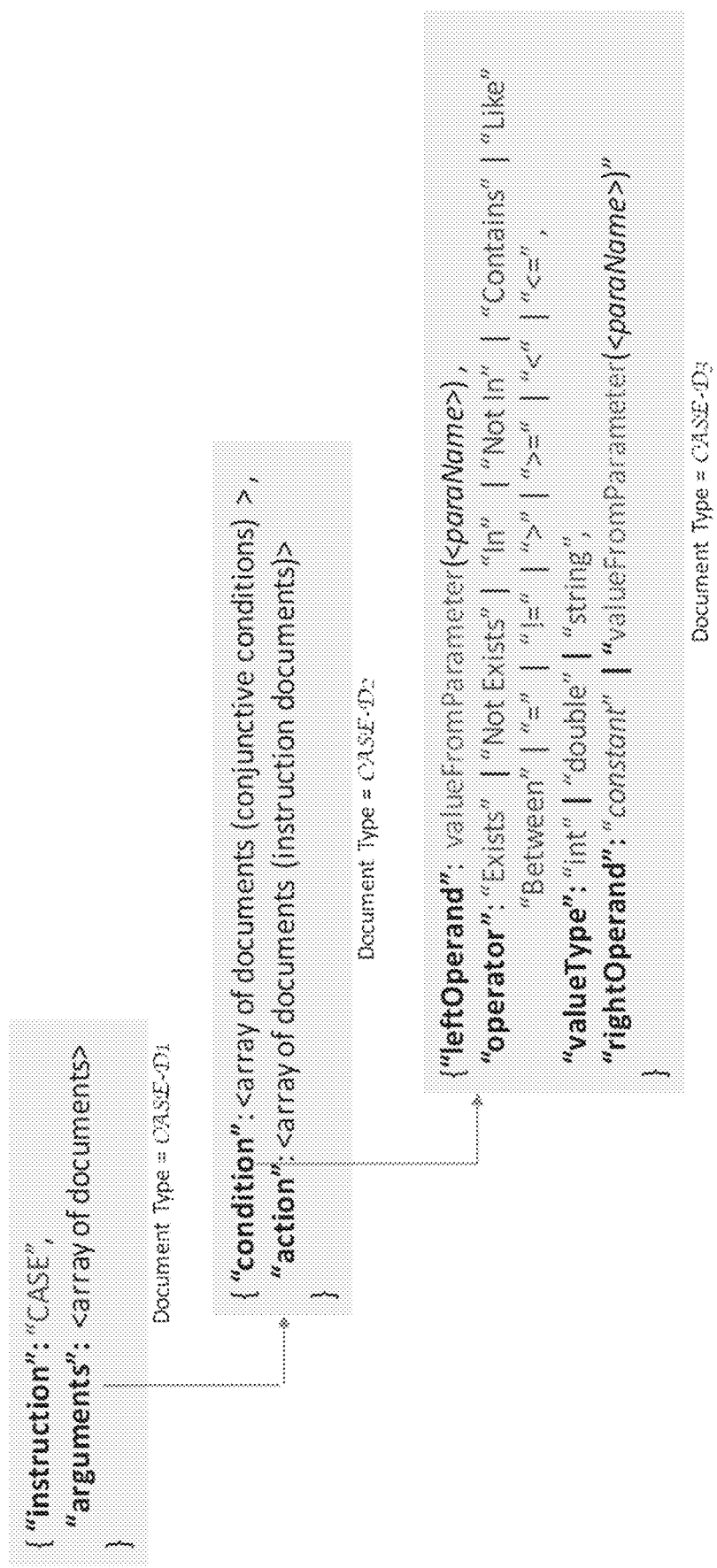
FIG. 7 shows the structure of the CASE instruction.

FIG. 7 shows the structure of the CASE instruction.

Document type CASE-D1 is the parent document of the CASE instruction, as shown in FIG. 7. The elements of document type CASE-D1 are described in Tables 10 and 11.

TABLE 10

| Element Name | Value Type | Value Domain | Description |
|---|---|---|---|
| "instruction" | String | Fixed value = "CASE" | This property indicates that the document is a CASE instruction. |
| "arguments" | Array of documents | JSON documents of type CASE-D2 | Each document defines one condition-action branch in the case statement. |

TABLE 11

| Element Name | Presence | Empty Content Allowed | Empty Content Representation |
|---|---|---|---|
| "instruction" | Mandatory | No | N/A |
| "arguments" | Mandatory | No | N/A |

Document type CASE-D2 is the second-level document of the CASE instruction, as shown in FIG. 7. Each document contains a list of one or more conjunctive predicates, and a list of one or more actions to be taken if the predicates evaluate to True. The elements of document type CASE-D2 are described in Tables 12 and 13.

TABLE 12

| Element Name | Value Type | Value Domain | Description |
|---|---|---|---|
| "condition" | Array of documents | JSON documents of type CASE-D3 | This is an array of documents representing a list of conjunctive predicates. That is, if all the predicates evaluate to True, then the actions defined in the "action" element are executed. |
| "action" | Array of documents | JSON documents of type ADD-D1 | Each document is an ADD instruction to add columns to the output schema list. The "action" documents execute only if the "condition" documents evaluate to True. |

TABLE 13

| Element Name | Presence | Empty Content Allowed | Empty Content Representation |
|---|---|---|---|
| "condition" | Mandatory | Yes (Indicates that the condition evaluates to True. Typically, as in most programming languages, this is the last branch of the CASE instruction.) | Empty array ([ ]) |
| "action" | Mandatory | Yes (Indicates that no action is taken.) | Empty array ([ ]) |

Document type CASE-D3 is the third-level document of the CASE instruction, as shown in FIG. 7. Each document represents a single condition. The elements of document type CASE-D3 are described in Tables 14 and 15.

TABLE 14

| Element Name | Value Type | Value Domain | Description |
|---|---|---|---|
| "leftOperand" | String | The value must be: "valueFromParameter <paraName>" | This field specifies the parameter from which the left operand value is retrieved. |
| "operator" | String | The value must be one of the following operators: "Exists", "Not Exists", "In", "Not In", "Contains", "Like", "Between", "=", "!=", ">", ">=", "<", "<=", | Each document is an ADD instruction to add columns to the output schema list. The "action" documents execute only if the "condition" documents evaluate to True. All operators except "Exists" and "Not Exists" mandate the presence of both the left and right operands, and the operators' semantics follows that of programming languages. "Exists" and "Not Exists" require only the left operand to be present, and they have the following semantics: "Exists": Returns True iff (if-and-only-if) the parameter specified in the "leftOperand" exists in the DSF invocation. Otherwise, returns False. "Not Exists": Returns True iff the parameter specified in the "leftOperand" does not exist in the DSF invocation. Otherwise, returns False. |
| "valueType" | String | The value is one of the following values: "int", "double", "string" | This property defines the data type based on which the comparison operator is evaluated.<br><br>Constraints: For operators "Exists" and "Not Exists", the property can be omitted, otherwise it is ignored. For all other operators, it is mandatory. For operators "Contains" and "Like", the "valueType" must be set to "string". |
| "rightOperand" | String | The value is one of the following: <constant>, or valueFromParameter(<paraName>) | The value of the right operand is either provided as a constant or retrieved from the specified parameter. The format of the "rightOperand" field depends on the comparison operator being used. Constraints: For operators "Exists" and "Not Exists", the property can be omitted, otherwise it is ignored. For all other operators, it is mandatory. "Exists": This property can be omitted, otherwise it is ignored. "Not Exists": This property can be omitted, otherwise it is ignored. "In": the value in the right operand is a comma-separated string. The string is parsed into a list of string values (the separator is the comma character). Finally, each string is casted to the type defined in "valueType" for evaluation. "Not In": the value in the right operand is a comma-separated string. The string is parsed into a list of string values (the separator is the comma |

TABLE 14-continued

| Element Name | Value Type | Value Domain | Description |
|---|---|---|---|
| | | | character). Finally, each string is casted to the type defined in "valueType" for evaluation. "Contains": the value in the right operand is a string that is checked as to whether it is contained within the left operand value. "Like": the value in the right operand is a regular expression string. The expression is evaluated using the standard C++ regular expression library (regex). "Between": the value in the right operand is a string consisting of two comma-separated values. The first value is the lower bound, and the $2^{nd}$ value is the upper bound. The values are casted to the type defined in "valueType" for evaluation. "=": the value in the right operand is a string, which is casted to the type defined in "valueType" for evaluation. "!=": the value in the right operand is a string, which is casted to the type defined in "valueType" for evaluation. ">": the value in the right operand is a string, which is casted to the type defined in "valueType" for evaluation. ">=": the value in the right operand is a string, which is casted to the type defined in "valueType" for evaluation. "<": the value in the right operand is a string, which is casted to the type defined in "valueType" for evaluation. "<=": the value in the right operand is a string, which is casted to the type defined in "valueType" for evaluation. |

TABLE 15

| Element Name | Presence | Empty Content Allowed | Empty Content Representation |
|---|---|---|---|
| "leftOperand" | Mandatory | No | N/A |
| "operator" | Mandatory | No | N/A |
| "valueType" | Optional (Only if the operator is set to "Exits" or "Not Exists") | No | N/A |
| "rightOperand" | Optional (Only if the operator is set to "Exits" or "Not Exists") | No | N/A |

As an example, the CASE instruction may be used to add the last three entries from the example illustrated in FIGS. 2 and 3 as shown below.

```
{"instruction": "CASE",
"argument":[
    {"condition":[{"leftOperand":"valuefromParameter(InputTupe
s)",
        "operator":"in",
        "valueType":"string",
        "rightOperand":"true,yes,t,y,1"
    }]
"action":[
    {"instruction": "ADD",
    "placement": "end",
    "arguments": {
        {"source": "parameter",
        "name": "ValueColumn.*",
        "datatype": "DOUBLE",
        "manipulations":[{"operation":"postfix",
            "argument": "_double"]
        }
        ]
    },
    {"source": "parameter",
    "name": "ValueColumn.*",
    "datatype": "LONG",
    "manipulations":[{"operation":"postfix",
```

```
        "argument": "_long"]
      }
    ]
  },
  {"source": "parameter",
   "name": "ValueColumn.*",
   "datatype": "VARCHAR",
   "manipulations":[{"operation":"postfix",
        "argument": "_str"]
      }
    ]
  },
}
```

Markup Language: DSF Property Specifications

As mentioned previously, the markup language is designed to capture the following properties:
 Output Schema
 Input Schema
 Predicate Push
 Cardinality Estimation
 Interesting Ordering In the following sections, the instructions and the language specifications for each of the targeted properties is presented.

Output Schema Property

The Output Schema property captures the schema of the DSF's output, which is consumed within the caller SQL query in the database system. The output schema is an ordered list and it captures the column names, the data types, and possibly nullability specifications.

This property is used for the compilation of the query and the generation of the query plan.

A DSF may generate multiple outputs. One of the outputs, referred to as the "primary output," may be returned to the caller SQL query. The other outputs are sent from the coprocessor system to the database system and are stored in relational tables. The function descriptor for the DSF maintains the output schema for each output that is candidate to be a primary output.

The DSF developer may decide which outputs are candidates to be a primary output. For example, assume a DSF, F( ), generates 5 outputs, namely O1, O2, O3, O4, and O5. Assume also that the DSF developer (who is assumed to be a domain expert) decided that only O1, O2, and O3 are candidates to be a primary output. In this case, each of these three outputs is given a unique Id (name), and the DSF descriptor includes the output schema specifications for each O1, O2, and O3 output. At query time, the user can pass a parameter to the DSF specifying which among the candidate outputs is the primary output.

Each candidate output may have a JSON document describing its output schema under the "$.outputSchema" element, where "$" is the root document (the document of type DESC-D1). In the case in which the output does not have a corresponding document, the database system uses the contract function mechanism to figure out the output schema, as discussed above in connection with FIGS. 5A and 5B.

The output schema document (of type OS-D1) has the following structure:

```
{ "property" : "outputSchema"
  "outputId": "<Output-unique-Id>"
  "instructions": <array of documents, each describes one
       instruction>
}
```

An output schema document may use both the ADD and CASE instructions in the instructions array. The elements in document type OS-D1 are described in Tables 16 and 17.

TABLE 16

| Element Name | Value Type | Value Domain | Description |
|---|---|---|---|
| "property" | String | Fixed value = "outputSchema" | This property indicates that the document is describing an output schema. |
| "outputId" | String | The value is one of the unique names assigned to the candidate outputs. If there is only one candidate output, then the value is set to "standard". | This property specifies the output whose schema is defined by this document. |
| "instructions" | Array of documents | JSON documents of type: ADD-D1 (ADD instruction), or CASE-D1 (CASE instruction) | Each document in the array is a single instruction document. The allowed instructions include: ADD, CASE |

TABLE 17

| Element Name | Presence | Empty Content Allowed | Empty Content Representation |
|---|---|---|---|
| "property" | Mandatory | No | N/A |
| "outputId" | Mandatory | No | N/A |
| "instructions" | Mandatory | Yes (Indicates that the descriptor does not provide output schema specifications for the output identified by "outputId". As a result, for that output, the contract function mechanism is used). | Empty array ([ ]) |

Input Schema Property

The input schema property captures the minimal (mandatory) set of columns that the DSF needs for execution.

The input schema property is used for enabling the projection-push optimization, which involves the elimination of any un-needed (or non-beneficial) columns before transferring the data to the coprocessor. Projection-push can significantly reduce the data transfer overhead if the base table has many columns while the DSF only needs few of these columns for its internal processing.

A DSF may have multiple inputs (multiple ON clauses), and each of these inputs may have a document under the "$.inputSchema" array element, where "$" is the root document (The document of type DESC-D1). If a given input does not have a corresponding document, then this implies that the projection-push optimization is not enabled for that input, and whatever the user specifies is sent to the coprocessor.

The input schema document (of type IS-D1) has the following structure:

```
{       "property" : "inputSchema" ,
        "inputId": "<inputPosition>" | "<alias>",
        "surplus": "unknown" | "notAllowed" | "ignored" |
            "propagatedBack",
        "nullElimination": "Yes" | "No",
        "instructions": <array of documents, each describes one
            instruction>
}
```

The elements in document type IS-D1 are described in Tables 18 and 19:

TABLE 18

| Element Name | Value Type | Value Domain | Description |
|---|---|---|---|
| "property" | String | Fixed value = "inputSchema" | This property indicates that the document is describing an input schema. |
| "inputId" | String | The string is either an integer number indicating the input's position among the other inputs (if any), or an arbitrary alias string | This property specifies the input whose minimal schema is being defined by this document. <inputPosition>: An integer number indicating the input's position among the other inputs (if any). It is used for DSFs using Position-Based Referencing. <alias>: Arbitrary string referring to one of the inputs' alias. It is used for DSFs using Alias-Based Referencing. |
| "surplus" | String | The value must be one of: "unknown", "notAllowed", "ignored", "propagatedBack" | This property specifies whether or not the DSF can accept additional columns beyond the required ones (called "surplus") and specifies the behavior of the DSF with respect to these additional columns. This behavior affects the types of optimizations that can be applied. "unknown": Indicates that the behavior is unknown, and the projection-push optimization is disabled in this case. "notAllowed": Indicates that the DSF does not accept any additional columns beyond those needed by the DSF. If additional columns are sent, the execution fails. For DSFs exhibiting this behavior, projection push is not required. Therefore, the "instructions" field can be simply set to [ ]. "ignored": Indicates that the DSF accepts additional columns (usually the required ones are defined in some parameters). |

TABLE 18-continued

| Element Name | Value Type | Value Domain | Description |
|---|---|---|---|
| | | | These additional columns are ignored (dropped) by the DSF. For DSFs exhibiting this behavior, projection push is critical, and these additional columns should be eliminated. "propagatedBack": Indicates that the DSF accepts additional columns (usually the required ones are defined in some parameters). These additional columns are ignored (skipped) during the evaluation, but they are returned along with the results, e.g., pass though columns. For DSFs exhibiting this behavior, projection push is a possibility. If the additional columns are not referenced in the caller SQL query, then they can be eliminated before the DSF's execution. Otherwise, the decision to apply the projection push (to eliminate the additional columns) becomes a cost-based optimization (either send them and get them back as pass though columns, or not to send them but execute a local join with the DSF's output to augment them back to the result set). |
| "nullElimination" | String | The value must be one of: "Yes", "No" | This property specifies whether or not the DSF ignores the records containing a null value in any of the required (mandatory) columns. "Yes": Indicates that the DSF ignores the records containing a null value in any of the required (mandatory) columns (which are specified by the "instructions" field (See below). If that is the case, the database system can eliminate these records before sending them to the coprocessor (it is a cost-based optimization from database system). "No": Indicates that the optimization of null-based record elimination is disabled for the input identified by the "inputId" field. |
| "instructions" | Array of documents | JSON documents of type ADD-D1 (ADD instruction) | Each document in the array is a single instruction document. The allowed instructions include: ADD CASE |

TABLE 19

| Element Name | Presence | Empty Content Allowed | Empty Content Representation |
|---|---|---|---|
| "property" | Mandatory | No | N/A |
| "inputId" | Mandatory | No | N/A |
| "surplus" | Mandatory | No | N/A |
| "nullElimination" | Optional | No | N/A |
| "instructions" | Mandatory | Yes (Indicates that for this input, just send whatever the user specifies in the query). | Empty array ([ ]) |

It is possible that for a given output, the "instructions" array in the OS-D1 document is not empty. However, when these instructions are applied over a given DSF invocation, they may return an empty output schema list. As an example, the "instructions" array may contain a CASE instruction, and at query time, none of the CASE branches evaluates to true. Since the output schema specifications are mandatory to have for the compilation of the query, an empty output schema list means that the function descriptor fails to provide the desired value, and the contract function fall back mechanism is executed, as described above in connection with FIGS. 5A and 5B.

In general, the specifications of the input schema are less important in some scenarios such as the following ones:

Small Dimensions Table as Input: If the input to be sent is very small, then projection push is not effective anyway.

Automatically-Generated Input: If the input table is generated from another function (e.g., from a nested function), and that generated input has the columns required by the outer function and there is no need for projection push on that input for the outer function.

Surplus="NotAllowed": In this case, the execution fails anyway if any extra columns are sent to the DSF, and thus projection push is not critical (the end-used should have taken care of that).

Surplus="Unknown": In this case, the projection-push optimization is disabled, and the "instructions" field is ignored.

In these scenarios, where the specifications of the input schema are less important, the recommendation is to simply set the "instructions" array for that input to empty array ([ ]).

Predicate Push Property

The predicate push property captures the possibility of pushing a post-DSF predicate, i.e., a predicate on the DSF's output, to be evaluated on the DSF's input instead. This property is used for enabling the predicate-push optimization, which involves the elimination of any unneeded records before transferring the data to the coprocessor. Predicate-push can significantly reduce the data transfer overhead, and it can also enable the generation of more efficient query plans by possibly leveraging available access paths.

A function descriptor may contain a predicate-push specification document for each candidate output under the "$.predicatePush" element, where "$" is the root document (i.e., the document of type DESC-D1). If for a given candidate output there is no corresponding document, then this means that the predicate push optimization is not enabled for that output. The predicate push document has the following structure:

```
{ "property" : "predicatePush" ,
    "outputId": "<output-unique-Id>",
    "targetInputId": "<inputPosition>" | "<alias>",
    "rowIndependence": "Yes" | "No" ,
    "partitionIndependence": "Yes" | "No"
}
```

The elements in document type PP-D1 are described in Tables 20 and 21.

TABLE 20

| Element Name | Value Type | Value Domain | Description |
|---|---|---|---|
| "property" | String | Fixed value = "predicatePush" | This property indicates that the document is describing the predicate push specifications. |
| "outputId" | String | The value is one of the unique names assigned to the candidate outputs. If there is only one candidate output, then the value is set to "standard". | This property specifies the output whose predicate-push properties are defined by this document. |
| "targetInputId" | String | The string is either an integer number indicating the input's position among the other inputs (if any), or an arbitrary alias string | This property specifies the DSF's input that is targeted for the predicate push (if a predicate is pushed). This property is needed because a DSF may have multiple inputs and it is possible to have ambiguity with respect to which input should receive the pushed predicate (if any). <inputPosition>: An integer number indicating the input's position among the other inputs (if any). It is used for DSFs using Position-Based Referencing <alias>: Arbitrary string |

TABLE 20-continued

| Element Name | Value Type | Value Domain | Description |
| --- | --- | --- | --- |
| | | | referring to one of the inputs' alias. It is used for DSFs using Alias-Based Referencing |
| "rowIndependence" | String | The value must be one of the following: "Yes", "No" | This property is set to "Yes" iff the DSF satisfies the following two conditions:<br>1. The DSF operates on each row independently of the others.<br>2. For a single input row, the DSF may produce:<br>zero output rows, or<br>one or more rows all as the input row values<br>(or subset of its fields) plus possibly additional columns<br>If this property is set to "Yes", then a post-DSF predicate on any of the input columns, that pass through to the output, can be pushed as a pre-DSF predicate and is evaluated on the DSF's input. |
| "partitionIndependence" | String | The value must be one of the following: "Yes", "No" | This property is set to "Yes" iff the DSF satisfies the following two conditions:<br>The DSF operates on each partition independent of the others<br>For a single input partition, the DSF may produce:<br>zero output rows, or<br>one or more rows all have the same values in the partitioning columns as those of the input partition (or subset of its fields) plus possibly additional columns<br>If this property is set to "Yes", then a post-DSF predicate on any of the partition by columns, that pass through to the output, can be pushed as a pre-DSF predicate and gets evaluated on the DSF's input.<br>Constraint:<br>"partitionIndependence" is applicable only to DSFs whose base input is partitioned, i.e., has PARTITION BY clause) involving non-trivial expressions, i.e., excluding expressions such as "PARTITION BY 1," that do not actually result in partitioning. |

TABLE 21

| Element Name | Presence | Empty Content Allowed | Empty Content Representation |
| --- | --- | --- | --- |
| "property" | Mandatory | No | N/A |
| "outputId" | Mandatory | No | N/A |
| "targetInputId" | Optional (If the DSF has one input, or both "rowIndependence" and "partitionIndependence" are set to "No") | No | N/A |

TABLE 21-continued

| Element Name | Presence | Empty Content Allowed | Empty Content Representation |
|---|---|---|---|
| "rowIndependence" | Mandatory | No | N/A |
| "partitionIndependence" | Mandatory | No | N/A |

Cardinality Estimation Property

The cardinality estimation property captures some estimates of the output cardinality (e.g., number of rows) of the DSF. This property is used for enabling better query planning, e.g., join planning and possibly avoiding IPE overhead.

A function descriptor may contain a cardinality estimation specification document for each candidate output under the "$.cardinalityEstimation" element, where "$" is the root document (The document of type DESC-D1). If for a given output there is no corresponding document, then this means that there is no cardinality estimation information available for that output. The document has the following structure:

```
{ "property" : "cardinalityEstimation",
   "outputId": "<Output-unique-Id>",
   "minCardinality": "unknown" | "<expr>" ,
   "maxCardinality": "unknown" | "<expr>" ,
   "expectedCardinality": "unknown" | "<expr>" ,
   "expConfidence" : "low" | "high"
}
```

The elements in document type CE-D1 are described in Tables 22, 23, and 24.

TABLE 22

| Element Name | Value Type | Value Domain | Description |
|---|---|---|---|
| "property" | String | Fixed value = "cardinalityEstimation" | This property indicates that the document is describing the cardinality estimation specifications. |
| "outputId" | String | The value is one of the unique names assigned to the candidate outputs. If there is only one candidate output, then the value is set to "standard". | This property specifies the output whose cardinality, i.e., the number of rows, is estimated by this document. |
| "minCardinality" | String | The value is either "unknown", or a string expression over some pre-defined operands | This property defines the minimum number of rows that can be returned from the DSF. "unknown": Indicates that the minimum cardinality is unknown. <expr>: A simple algebraic expression over operands of the format defined in Table Cardinality-Expr. The allowed algebraic operators in the expression are: "+", "−", "*", "/" |
| "maxCardinality" | String | The value is either "unknown", or a string expression over some pre-defined operands | This property defines the maximum number of rows that can be returned from the DSF. "unknown": Indicates that the maximum cardinality is unknown. <expr>: A simple algebraic expression over operands of the format defined in Table Cardinality-Expr. The allowed algebraic operators in the expression are: "+", "−", "*", "/" |
| "expectedCardinality" | String | The value is either "unknown", or a string expression over some pre-defined operands | This property defines the expected (average) number of rows that can be returned from the DSF. "unknown": Indicates that the average cardinality is unknown. <expr>: A simple algebraic expression over operands of the format defined in Table Cardinality-Expr. The allowed algebraic operators in the expression are: "+", "−", "*", "/" |

TABLE 22-continued

| Element Name | Value Type | Value Domain | Description |
|---|---|---|---|
| "expConfidence" | String | The value is one of: "low", "high" | The confidence of the provided estimations. This confidence is for the "expectedCardinality" field. |

TABLE 23

| Operand Format | Meaning |
|---|---|
| \|<InputId>\| | The cardinality of InputId. InputId is an input reference that uses either of Position-Based Referencing or Alias-Based Referencing |
| \|<InputId>.PartitionBy\| | The number of partitions created by the PartitionBy clause of InputId |
| \|<ParameterName>\| | The number of values listed in the specified parameter |
| valueFromParameter(<parName>) | The value defined inside the specified parameter |
| val | Constant value |

TABLE 24

| Element Name | Presence | Empty Content Allowed | Empty Content Representation |
|---|---|---|---|
| "property" | Mandatory | No | N/A |
| "outputId" | Mandatory | No | N/A |
| "minCardinality" | Mandatory | No | N/A |
| "maxCardinality" | Mandatory | No | N/A |
| "expectedCardinality" | Mandatory | No | N/A |
| "expConfidence" | Mandatory | No | N/A |

Interesting Ordering Property

The interesting ordering property captures whether the output of the DSF inherits or obeys specific ordering or partitioning schemes. This property is used for enabling better query planning by possibly avoiding unnecessary re-ordering or re-distribution.

A function descriptor may contain an interesting-ordering specification document for each candidate output under the "$.interestingOrdering" element, where "$" is the root document (The document of type DESC-D1). If for a given output there is no corresponding document, then this means that no interesting ordering properties are available for that output. The document has the following structure:

```
{ "property" : "interestingOrdering ",
"outputId": "<Output-unique-Id>",
"preserveInPartitioning": "No" | "<inputPosition>" | "<alias>",
"preserveInOrdering": "No" | "<inputPosition>" | "<alias>",
"introducePartitioning": "No" | <expr>,
"introduceOrdering": "No" | <expr>
}
```

The elements in document type ORD-D1 are described in Tables 25 and 26:

TABLE 25

| Element Name | Value Type | Value Domain | Description |
|---|---|---|---|
| "property" | String | Fixed value = "interestingOrdering" | This property indicates that the document is describing the interesting-ordering specifications. |
| "outputId" | String | The value is one of the unique names assigned to the candidate outputs. If there is only one candidate output, then the value is set to "standard". | This property specifies the output whose interesting orderings are described by this document. |
| "preserveInPartitioning" | String | The string can be a constant "No", or an integer number indicating the input's position among the other inputs (if any), or an arbitrary alias string | This property specifies whether or not the output of the DSF is preserving the same partitioning on the input. "No": Indicates that no partitioning is preserved. <inputPosition>: An integer number indicating the input's position among the other inputs (if any). This is the input that the output follows its partitioning scheme. It is used for DSFs using Position-Based Referencing <alias>: Arbitrary |

TABLE 25-continued

| Element Name | Value Type | Value Domain | Description |
|---|---|---|---|
| "preserveInOrdering" | String | The string can be a constant "No", or an integer number indicating the input's position among the other inputs (if any), or an arbitrary alias string | string referring to one of the inputs' alias. This is the input that the output follows its partitioning scheme. It is used for DSFs using Alias-Based Referencing This property specifies whether or not the output of the DSF is preserving the same ordering of the input. "No": Indicates that no ordering is preserved. <inputPosition>: An integer number indicating the input's position among the other inputs (if any). This is the input that the output follows its ordering scheme. It is used for DSFs using Position-Based Referencing (Section 3.1.2). <alias>: Arbitrary string referring to one of the inputs' alias. This is the input that the output follows its ordering scheme. It is used for DSFs using Alias-Based Referencing. |
| "introducePartitioning" | String | The string can be a constant "No", or a comma-separated-value string | This property specifies whether or not the DSF is producing the output with a specific new partitioning. "No": Indicates that no specific partitioning is introduced. <csv-expr>: The comma-separated-value expression captures the output columns on which the output is partitioned. It takes one of the following two forms: csv-columnNames ("Col1, Col2, . . ."): A list of column names. Constraints: Column names work only if the names are predefined, i.e., do not depend on the DSF's inputs or parameters. csv-columnPositions ("2, 4, . . ."): A list of column positions. Constraints: Column positions work only if the names are dynamic but the positions are fixed. If neither of the column names nor the column positions are applicable, then the value msut be set to "No". |

TABLE 25-continued

| Element Name | Value Type | Value Domain | Description |
|---|---|---|---|
| "introduceOrdering" | String | The string can be a constant "No", or a comma-separated-value string | This property specifies whether or not the DSF is producing the output in a specific new ordering. "No": Indicates that no specific ordering is introduced. <csv-expr>: The comma-separated-value expression captures the output columns on which the output is ordered. It takes one of the following two forms: csv-columnNames ("Col1, Col2, . . ."): A list of column names. Constraints: Column-names format works only if the names are predefined, i.e., do not depend on the DSF's inputs or parameters. csv-columnPositions ("2, 4, . . ."): A list of column positions. Constraints: Column-positions format works only if the names are dynamic but the positions are fixed. If neither of the column names nor the column positions are applicable, then the value must be set to "No". |

TABLE 26

| Element Name | Presence | Empty Content Allowed | Empty Content Representation |
|---|---|---|---|
| "property" | Mandatory | No | N/A |
| "outputId" | Mandatory | No | N/A |
| "preserveInPartitioning" | Mandatory | No | N/A |
| "preserveInOrdering" | Mandatory | No | N/A |
| "introducePartitioning" | Mandatory | No | N/A |
| "introduceOrdering" | Mandatory | No | N/A |

For DSF execution through QUERYGRID, the Interesting Ordering properties may not be useful because the current implementation of the QUERYGRID does not preserve the partitioning or ordering of the transferred data. However, the Interesting Ordering properties are still useful for the TERADATA local functions.

Miscellaneous Design and Setup Considerations

Input Referencing Mechanism (Position-Based vs. Alias-Based)

Each function descriptor is consistent in the referencing mechanism used for the inputs (the ON clauses). Throughout a given descriptor, the referencing is either position-based or alias-based.

Mixing the two referencing mechanisms in a single descriptor may result in missing optimization opportunities due to a possible mismatch between the descriptor instructions and a given query.

If there are DSFs that mandate alias when multiple ON clauses are used and do not mandate the alias when only one ON clause is used, the descriptor uses the alias-based referencing mechanism (the general case). And queries use alias even if only one ON clause is used.

Storage Limitations and Workarounds

Function descriptors are stored in a dictionary table, in TERADATA the UDFInfo table in a TERADATA database system. Since size is very critical in dictionary tables, the descriptor size is limited to roughly 3K (i.e., 3000) bytes. This size accommodates most descriptors without exceeding the limit.

In the cases where the limit is exceeded, some JSON segments from the descriptor may need to be removed. The list below gives some guidelines on which segments can be removed and the related impact:

Output Schema Specifications: This segment does not enable optimizations, but rather it is needed for contract-bypassed compilation. The instructions of the output schema can be removed from the descriptor, and the system should gracefully fall back to the contract function mechanism.

Input Schema Specifications: There are several scenarios in which providing the instructions for input schema specifications is neither effective nor critical, as discussed above. In these cases, the corresponding JSON segments can be removed.

Interesting Ordering Properties: The QUERYGRID does not guarantee the ordering sent to or generated from the coprocessor functions, as discussed above. Therefore, such JSON segment can be removed.

Uploading Function Descriptors to Database Dictionaries

The mechanism of uploading the function descriptor to the database dictionary table varies depending on the source of the function. If the function is local to the database system, then the descriptor may be uploaded as part of the CREATE FUNCTION DDL command. In contrast, if the function is remote (i.e., a DSF), then the descriptor may be uploaded as part of the installation procedure that installs the DSF into the database system, as discussed in connection with FIG. 4.

Using DSFs When the Output Schema Cannot Be Expressed Using the Markup Language

As mentioned above, the markup language is designed to cover the needs for the majority of the DSFs. There are some DSFs that have been observed, which are not covered by the markup language as described above, i.e., their properties cannot be expressed using the instructions described above.

In the cases where the output schema is the property that cannot be expressed using the markup language, then the contract function mechanism described above in connection with FIGS. 5A and 5B is mandatory, and it is automatically activated (as the fallback mechanism). In the cases where other properties, e.g., input schema, predicate push, etc., are the ones that cannot be expressed using the markup language, then the no-optimization mode takes precedence and the corresponding DSFs can still execute but without optimizations, as discussed above in connection with FIGS. 5A and 5B.

FIG. 8 shows the specifications of a Pivot DSF invocation. FIG. 9 shows the output schema specifications for the Pivot DSF. An example of a DSF in which the output schema cannot be expressed using the markup language is illustrated in FIGS. 8 and 9.

FIG. 10 shows an example Pivot DSF invocation and output schema. The output columns are: the list of columns in the "PartitionColumns" parameter followed by a number of columns, each of which is named "colName_i", where "colName" is the value defined in the "TargetColumns" parameter, and "i" ranges from 0 to the value defined in the "NumberOfRows" parameter. If "TargetColumns" lists multiple columns, e.g., 'X' and 'Y', then the output will be [ . . . , X_0, X_1, . . . , Y_0, Y_1, . . . ].

Capturing such output schema uses looping capabilities and nested looping.

FIG. 11 shows the specifications of a PCAPlot DSF. FIG. 12 shows the output schema for the PCAPlot DSF. FIG. 13 shows an example of the invocation of PCAPlot DSF and the resulting output schema. The PCAPlot DSF uses the looping capability.

FIG. 14 shows the specifications of a NaiveBayesPredict DSF. FIG. 15 shows the output schema for the NaiveBayesPredict DSF. FIG. 16 shows an example of the invocation of NaiveBayesPredict DSF and the resulting output schema. The number of columns in the output schema and their names depend on the NaiveBayes model passed to the DSF in the "Model" parameter, which cannot be captured by the markup language. In the NaiveBayesPredict DSF, the model values can be explicitly specified in parameter "Response", and in this case, the "Model" parameter is not needed. Therefore, the output schema specifications for NaiveBayesPredict may still provide instructions on how to infer the property under the condition that the "Response" parameter exists (using CASE instruction). Otherwise, the function descriptor returns an empty output schema document.

LOOP Instruction

The LOOP instruction is used when looping or iterating over a set of instructions is needed, such as in the Pivot DSF, discussed in connection with FIGS. 8-10 and the PCAPlot DSF, discussed in connection with FIGS. 11-13. The structure of the LOOP instruction document, type LOOP-D1, is illustrated in FIG. 17.

The elements of document type LOOP-D1 are described in Tables 27 and 28.

TABLE 27

| Element Name | Value Type | Value Domain | Description |
| --- | --- | --- | --- |
| "instruction" | String | Fixed value = "LOOP" | This property indicates that the document is a LOOP instruction. |
| "numIterations" | String | The values takes one of three possible forms: "constant", "valueFromParameter(. . .)", "EnumFromParameter(. . .)" | This property specifies the number of iterations to execute. "constant": A constant positive integer value is specified to determine the number of iterations. "valueFromParameter(<parName>)": The specified parameter must return a positive integer value, which determines the number of iterations. "EnumFromParameter(<parName>)": The specified parameter must return a comma-separated list of values. The number of these values determines the number of iterations. The values within the list are treated as strings. |
| "startIndex" | String | The value is either "0" or "1" | This property specifies the start value of the iteration index (iteration.index variable), which can be referenced in the arguments field. |

TABLE 27-continued

| Element Name | Value Type | Value Domain | Description |
|---|---|---|---|
| "arguments" | Array of documents | JSON documents of type ADD-D1 or CASE-D1 | The entire array of documents executes for each iteration. The documents can reference two reserved keywords, namely "iteration.index" and "iteration.value", e.g., to be concatenated with column names. "iteration.index": Returns an integer representing the iteration number. This variable starts with the value specified in "startIndex" field, and gets incremented by 1 after each iteration. "iteration.value": This variable is applicable only for "EnumFromParameter( )", and NULL otherwise. With each iteration, it carries one of the values from the CSV list specified in "numIterations" field (in ordered manner). |

TABLE 28

| Element Name | Presence | Empty Content Allowed | Empty Content Representation |
|---|---|---|---|
| "instruction" | Mandatory | No | N/A |
| "numIterations" | Mandatory | No | N/A |
| "startIndex" | Mandatory | No | N/A |
| "arguments" | Mandatory | No | N/A |

Demonstration of the Enabled Optimizations
Projection Push Optimization

Projection push can significantly reduce the data transfer overhead if the base table has many columns while the DSF only needs few of these columns for its internal processing.

The following example uses a GLM (Generalized Linear Model) DSF to illustrate this optimization:

```
SELECT *    FROM GLM@coprocessor (
            ON (SELECT * FROM admissions_train) as InputTable
            USING
                OutputTable ('glm_admissions_model')
                InputColumns ('admitted','masters', 'id', 'gpa',
                'programming')
                CategoricalColumns ('masters', 'programming')
                Family ('LOGISTIC')
) as glmtb;
```

The input table to the DSF, i.e., admissions_train in the example, has the following table schema:

```
admissions_train(id int,
    masters char(100),
    gpa float,
    programming char(100),
    admitted int,
    fatcol char(10000));
```

The input schema property, which is relevant for projection push optimization, of the function descriptor document for the GLM DSF is shown below.

```
{"functionName": "GLM",
  "inputSchema": [
        { "property" : "inputSchema" ,
          "inputId": "1",
          "surplus": "ignored",
          "nullElimination": "No",
          "instructions": [ { "instruction": "ADD",
                "placement": "end",
                "arguments": [
                {"source": "parameter" ,
                  "name": "InputColumns.*" ,
                  "dataType": "unchanged",
                  "manipulations": [ ]
                },
                {"source": "parameter" ,
                  "name": "Weight.*" ,
                  "dataType": "unchanged",
                  "manipulations": [ ]
                }
              ]
            }
          ]
        }
      ],
      ...
}
```

As defined in the function descriptor, only the columns specified in the InputColumns and Weight parameters are required for the function execution. Therefore, the function only needs five columns, i.e., {id, masters, gpa, programming, admitted}. The last column in the table, i.e., "fatcol", is not needed by the function. As a result, the query can be equivalently re-written as shown below, which eliminates "fatcol" from the InputColumns list, thereby reducing the amount of data required to be sent to the coprocessor.

```
SELECT *   FROM GLM@coprocessor (
               ON (SELECT admitted, masters, id, gpa,
               programming FROM
                   admissions_train) as InputTable
               USING
                   OutputTable ('glm_admissions_model')
                   InputColumns ('admitted','masters', 'id', 'gpa',
                   'programming')
                   CategoricalColumns ('masters', 'programming')
                   Family ('LOGISTIC')
) as glmtb;
```

Predicate Push Optimization

The predicate push optimization can significantly reduce the data transfer overhead due to the elimination of unneeded records. Moreover, it can enable the generation of more efficient query plans by possibly leveraging available access paths. The following example query illustrates this optimization using the Sessionize DSF illustrated in FIG. 1 and repeated below.

```
SELECT *
FROM ( SELECT * FROM SESSIONIZE@coprocessor (
       ON (SELECT * FROM web_click)
       PARTITION BY userid
       ORDER BY clicktime
       USING
           TimeColumn ('clicktime')
           TimeOut ('60')
       )AS output) AS q
WHERE userid = 0;
```

A possible function descriptor document for the Sessionize DSF is shown below. Only the predicate push property, which is relevant for predicate push optimization, is shown.

```
{"functionName": "SESSIONIZE",
   "predicatePush": [{"property" : "predicatePush" ,
       "outputId": "standard",
       "targetInputId": "1",
       "rowIndependence": "No",
       "partitionIndependence": "Yes"
   }],
   ...
}
```

Since the partitionIndependence flag is set to "Yes", rows across different partitions are processed independently by the Sessionize function. As the user is interested only in rows in partition userid=0, the post-function predicate (in our example "userid=0") can be applied on the function's input and only the required rows are sent to the remote coprocessor. As a result, the query can be equivalently re-written to the version shown below.

```
SELECT *
FROM ( SELECT * FROM SESSIONIZE@coprocessor (
       ON (SELECT * FROM web_click WHERE userid = 0)
       PARTITION BY userid
       ORDER BY clicktime
       USING
           TimeColumn ('clicktime')
           TimeOut ('60')
       )as output) as q
;
```

Further examples consistent with the present teaching are set out in the following numbered clauses.

Clause 1. A method comprising:

a database system receiving a request from a user, wherein the request invokes a data set function (DSF) and uses a property to be provided by the DSF;

the database system determining that a function descriptor is available for the DSF, wherein the function descriptor is expressed as markup language instructions, and wherein the function descriptor defines the property of the DSF; and the database system using the function descriptor to define a property for the DSF.

Clause 2. The method of clause 1 further comprising:

a developer creating the DSF to execute on a remote system;

the developer writing the descriptor for the DSF; and the database system receiving and storing the descriptor for the DSF.

Clause 3. The method of clause 1 further comprising:

a developer creating the DSF to execute on the database system;

the developer writing the descriptor for the DSF; and the database system receiving and storing the descriptor for the DSF.

Clause 4. The method of any of clauses 1-3, wherein the markup language is an instruction-based language.

Clause 5. The method of any of clauses 1-4, further comprising using the function descriptor to define an output schema for the DSF.

Clause 6. The method of any of clauses 1-5, further comprising using the function descriptor to define an input schema for the DSF.

Clause 7. The method of any of clauses 1-6, further comprising using the function descriptor to determine to push a predicate in the request from the DSF's output to the input of the DSF.

Clause 8. The method of any of clauses 1-7, further comprising using the function descriptor to determine to push a projection in the request from the input of the DSF to the output of the DSF.

Clause 9. The method of any of clauses 1-8, further comprising using the function descriptor to estimate a cardinality of the property.

Clause 10. The method of any of clauses 1-3, further comprising using the function descriptor to determine if the DSF inherits or obeys specific ordering or partitioning schemes.

Clause 11. A non-transitory computer-readable tangible medium, on which is recorded a computer program, the computer program comprising executable instructions, that, when executed, perform a method comprising:

a database system receiving a request from a user, wherein the request invokes a data set function (DSF) and uses a property to be provided by the DSF;

the database system determining that a function descriptor is available for the DSF, wherein the function descriptor is expressed as markup language instructions, and wherein the function descriptor defines the property of the DSF; and the database system using the function descriptor to define a property for the DSF.

Clause 12. The computer program of clause 11 wherein the method further comprises:
a developer creating the DSF to execute on a remote system;
the developer writing the descriptor for the DSF; and
the database system receiving and storing the descriptor for the DSF.

Clause 13. The computer program of clause 11 wherein the method further comprises:
a developer creating the DSF to execute on the database system;
the developer writing the descriptor for the DSF; and
the database system receiving and storing the descriptor for the DSF.

Clause 14. The computer program of any of clauses 11-13, wherein the method further comprises using the function descriptor to define an output schema for the DSF.

Clause 15. The computer program of clauses 11-14, wherein the method further comprises using the function descriptor to define an input schema for the DSF.

Clause 16. The computer program of clauses 11-15, wherein the method further comprises using the function descriptor to determine to push a predicate in the request from the DSF's output to the input of the DSF.

Clause 17. The computer program of clauses 11-16, wherein the method further comprises using the function descriptor to determine to push a projection in the request from the input of the DSF to the output of the DSF.

Clause 18. The computer program of clauses 11-17, wherein the method further comprises using the function descriptor to estimate a cardinality of the property.

Clause 19. The computer program of clauses 11-18, wherein the method further comprises to using the function descriptor to determine if the DSF inherits or obeys specific ordering or partitioning schemes.

Clause 20. A method comprising:
a database system receiving a request from a user, wherein the request invokes a data set function (DSF) and uses a property to be provided by the DSF;
the database system determining that a function descriptor is not available for the DSF;
the database system determining that a contract function is available for the DSF; and
the database system using the contract function to optimize the request.

Note that, while the above description is directed to a few specific uses for the techniques described herein (such as predicate push/pull), it will be understood that there are numerous other applications for the techniques described herein, such as in join planning using not just cardinality but also historical estimates or in join order.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
a database system receiving a request from a user, wherein the request invokes a data set function (DSF) and uses a property to be provided by the DSF;
the database system determining that a function descriptor is available for the DSF, wherein the function descriptor is expressed as markup language instructions, wherein the markup language instructions include one or more of an ADD instruction and a CASE instruction wherein the ADD instruction adds a column to a function descriptor schema and wherein the CASE instruction includes or excludes a column in a function descriptor schema depending on the presence or absence of values or parameters in the invocation of the DSF and wherein the markup language instructions are processed when the request is executed, and wherein the function descriptor defines the property of the DSF; and
the database system using the function descriptor to define a property for the DSF.

2. The method of claim 1 further comprising:
a developer creating the DSF to execute on a remote system;
the developer writing the descriptor for the DSF; and
the database system receiving and storing the descriptor for the DSF.

3. The method of claim 1 further comprising:
a developer creating the DSF to execute on the database system;
the developer writing the descriptor for the DSF; and
the database system receiving and storing the descriptor for the DSF.

4. The method of claim 1, wherein the markup language is an instruction-based language.

5. The method of claim 1, further comprising using the function descriptor to define an output schema for the DSF.

6. The method of claim 1, further comprising using the function descriptor to define an input schema for the DSF.

7. The method of claim 1, further comprising using the function descriptor to determine to push a predicate in the request from the DSF's output to the input of the DSF.

8. The method of claim 1, further comprising using the function descriptor to determine to push a projection in the request from the input of the DSF to the output of the DSF.

9. The method of claim 1, further comprising using the function descriptor to estimate a cardinality of the property.

10. The method of claim 1, further comprising using the function descriptor to determine if the DSF inherits or obeys specific ordering or partitioning schemes.

11. A non-transitory computer-readable tangible medium, on which is recorded a computer program, the computer program comprising executable instructions, that, when executed, perform a method comprising:
a database system receiving a request from a user, wherein the request invokes a data set function (DSF) and uses a property to be provided by the DSF;
the database system determining that a function descriptor is available for the DSF, wherein the function descriptor is expressed as markup language instructions, and wherein the function descriptor defines the property of the DSF, wherein the markup language instructions include one or more of an ADD instruction and a CASE instruction wherein the ADD instruction adds a column to a function descriptor schema and wherein the CASE instruction includes or excludes a column in a function descriptor schema depending on the presence or absence of values or parameters in the invocation of the DSF and wherein the markup language instructions are processed when the request is executed, and wherein the function descriptor defines the property of the DSF; and the database system using the function descriptor to define a property for the DSF.

12. The computer program of claim 11 wherein the method further comprises:
- a developer creating the DSF to execute on a remote system;
- the developer writing the descriptor for the DSF; and
- the database system receiving and storing the descriptor for the DSF.

13. The computer program of claim 11 wherein the method further comprises:
- a developer creating the DSF to execute on the database system;
- the developer writing the descriptor for the DSF; and
- the database system receiving and storing the descriptor for the DSF.

14. The computer program of claim 11, wherein the method further comprises using the function descriptor to define an output schema for the DSF.

15. The computer program of claim 11, wherein the method further comprises using the function descriptor to define an input schema for the DSF.

16. The computer program of claim 11, wherein the method further comprises using the function descriptor to determine to push a predicate in the request from the DSF's output to the input of the DSF.

17. The computer program of claim 11, wherein the method further comprises using the function descriptor to determine to push a projection in the request from the input of the DSF to the output of the DSF.

18. The computer program of claim 11, wherein the method further comprises using the function descriptor to estimate a cardinality of the property.

19. The computer program of claim 11, wherein the method further comprises using the function descriptor to determine if the DSF inherits or obeys specific ordering or partitioning schemes.

20. A method comprising:
- a database system receiving a request from a user, wherein the request invokes a data set function (DSF) to be performed remotely on a coprocessor, wherein the coprocessor is a data processing engine separate from that executing the database system and uses a property to be provided by the DSF;
- the database system determining that a function descriptor that describes an output schema and an input schema for the DSF is not available for the DSF;
- the database system determining that a contract function is available for the DSF, wherein the contract function is used by the database system to communicate with the coprocessor at query time to retrieve DSF properties; and
- the database system using the contract function to optimize the request.

* * * * *